United States Patent
Hida et al.

(10) Patent No.: US 11,628,886 B2
(45) Date of Patent: Apr. 18, 2023

(54) VEHICLE BODY SIDE STRUCTURE

(71) Applicant: HONDA MOTOR CO., LTD., Tokyo (JP)

(72) Inventors: Kazunori Hida, Wako (JP); Hiroyuki Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 17/428,644

(22) PCT Filed: Jan. 29, 2020

(86) PCT No.: PCT/JP2020/003139
§ 371 (c)(1),
(2) Date: Aug. 5, 2021

(87) PCT Pub. No.: WO2020/166336
PCT Pub. Date: Aug. 20, 2020

(65) Prior Publication Data
US 2022/0111905 A1 Apr. 14, 2022

(30) Foreign Application Priority Data

Feb. 14, 2019 (JP) .............................. JP2019-024472

(51) Int. Cl.
*B62D 25/02* (2006.01)
*B62D 21/15* (2006.01)
(Continued)

(52) U.S. Cl.
CPC ......... *B62D 25/025* (2013.01); *B62D 21/157* (2013.01); *B62D 25/04* (2013.01); *B62D 25/2036* (2013.01); *B62D 27/02* (2013.01)

(58) Field of Classification Search
CPC .... B62D 25/02; B62D 25/2036; B62D 25/04; B62D 25/025; B62D 25/023; B62D 21/157
(Continued)

(56) References Cited

U.S. PATENT DOCUMENTS

| 4,682,812 A | 7/1987 | Hurten et al. |
| 10,112,654 B1 | 10/2018 | Muckenhirn et al. |
| 2019/0009824 A1 | 1/2019 | Watanabe et al. |

FOREIGN PATENT DOCUMENTS

| CN | 1982139 | 6/2007 |
| CN | 101804826 | 8/2010 |

(Continued)

OTHER PUBLICATIONS

Chinese Notice of Allowance for Chinese Patent Application No. 202080007263.9 dated Oct. 26, 2022.
(Continued)

*Primary Examiner* — Dennis H Pedder
(74) *Attorney, Agent, or Firm* — Amin, Turocy & Watson, LLP

(57) ABSTRACT

A vehicle body side structure includes a side panel assembly and a floor assembly. The side panel assembly has a side sill outer panel part fixed to a side sill reinforcement member and a fastening nut provided on a rear end portion of the side sill reinforcement member. The floor assembly has a wheel arch reinforcement member fixed to an inner panel front portion and a collar interposed between the wheel arch reinforcement member and the inner panel front portion. The side panel assembly is assembled to the floor assembly by fastening a fastening bolt to the fastening nut.

10 Claims, 9 Drawing Sheets

(51) Int. Cl.
*B62D 25/04* (2006.01)
*B62D 25/20* (2006.01)
*B62D 27/02* (2006.01)

(58) Field of Classification Search
USPC ............ 296/203.01, 203.03, 203.04, 193.05, 296/193.08, 29
See application file for complete search history.

(56) References Cited

FOREIGN PATENT DOCUMENTS

| | | |
|---|---|---|
| CN | 103998330 | 8/2014 |
| CN | 105209326 | 12/2015 |
| DE | 3521607 | 12/1986 |
| JP | 04-027630 | 1/1992 |
| JP | 2006-312358 | 11/2006 |
| JP | 2008-081035 | 4/2008 |
| JP | 2018-127225 | 8/2018 |
| JP | 2019-014331 | 1/2019 |
| WO | 2018/212161 | 11/2018 |

OTHER PUBLICATIONS

International Search Report for International Application No. PCT/JP2020/003139 dated Apr. 7, 2020, 4 pages.

VEHICLE BODY SIDE STRUCTURE

TECHNICAL FIELD

The present invention relates to a vehicle body side structure.

Priority is claimed on Japanese Patent Application No. 2019-024472, filed Feb. 14, 2019, the content of which is incorporated herein by reference.

BACKGROUND ART

Among vehicle body side structures, there is a configuration in which a corner section between a side sill reinforcement member and an inner panel at a door opening section is formed in a V shape. In the case of this vehicle body side structure, for example, when a load is input to a vehicle body due to a lateral collision, it is conceivable that stress will be concentrated on the V-shaped corner section due to the input load.

As an example of a countermeasure, there is known a vehicle body side structure in which a wheel arch reinforcement member is provided on an inner panel and a front end portion of the wheel arch reinforcement member crosses a joining section between the side sill reinforcement member and the inner panel and extends forward in a vehicle body. The front end portion of the wheel arch reinforcement member extending to the front of the vehicle body is joined to a rear end portion of the side sill reinforcement member through welding while overlapping the side sill reinforcement member from an outer side of the vehicle body.

Accordingly, since the front end portion of the wheel arch reinforcement member is provided across the V-shaped corner section, stress and rigidity of the corner section can be secured. Accordingly, for example, when a load is input to the vehicle body due to a lateral collision and stress is concentrated on the corner section, the stress can be supported by the corner section (for example, see Patent Literature 1).

CITATION LIST

Patent Literature

[Patent Literature 1]
Japanese Unexamined Patent Application, First Publication No. 2006-312358

SUMMARY OF INVENTION

Technical Problem

However, in the vehicle body side structure of Patent Literature 1, the front end portion of the wheel arch reinforcement member extends across the joining section to the front of the vehicle body, and the extended front end portion is joined to the rear end portion of the side sill reinforcement member from an outer side of the vehicle body through welding. Accordingly, for example, in the case of a vehicle including an outer side panel as an exterior member on the side sill reinforcement member at an outer side of the vehicle body, a closed cross section is formed by the side sill reinforcement member and the outer side panel. An area attached through welding is disposed inside the closed cross section. For this reason, it is difficult to join the front end portion of the wheel arch reinforcement member to the rear end portion of the side sill reinforcement member through welding.

An aspect of the present invention is directed to providing a vehicle body side structure capable of bonding a wheel arch reinforcement member to a side sill reinforcement member from an outer side of a vehicle body in a vehicle including an outer side panel.

Solution to Problem (1) A vehicle body side structure of the present invention includes a side panel assembly that has an outer side panel fixed to a side sill reinforcement member and a that has a first fastening member provided on a surface of the side sill reinforcement member at a side of the outer side panel; and a floor assembly that has a wheel arch reinforcement member fixed to an inner panel and that has a collar interposed between the wheel arch reinforcement member and the inner panel at a position corresponding to the first fastening member, and the side panel assembly is assembled to the floor assembly from an outer side of a vehicle body by fastening a second fastening member to the first fastening member via the inner panel, the collar, the wheel arch reinforcement member and the side sill reinforcement member from the outer side of the vehicle body.

In this way, the side panel assembly can be assembled to the floor assembly from an outer side of the vehicle body by fastening the second fastening member to the first fastening member from the outer side of the vehicle body. Here, the first fastening member is provided on the side sill reinforcement member, and the collar is interposed between the wheel arch reinforcement member and the inner panel. Accordingly, in the vehicle including the outer side panel, the wheel arch reinforcement member is reliably (strongly) fastened to the side sill reinforcement member by the first fastening member and the second fastening member from an outer side of the vehicle body.

Here, the corner section of the door opening section is formed in the V shape by the side sill reinforcement member and the inner panel. For this reason, for example, it is conceivable that when the load is input to the vehicle body due to a lateral collision, stress will be concentrated on the corner section formed in the V shape.

Here, the wheel arch reinforcement member can be reliably (strongly) fastened to the side sill reinforcement member by the first fastening member and the second fastening member from an outer side of the vehicle body. Accordingly, when a load is input to the vehicle body due to a lateral collision and stress is concentrated on the corner section, stress can be supported by the corner section.

(2) In the aspect of the above-mentioned (1), a front end portion of the wheel arch reinforcement member may be widened so as to match with the side sill reinforcement member such that a hollow structure formed between the inner panel and the wheel arch reinforcement member is continuous with a hollow side sill.

In this way, the hollow structure formed by the wheel arch reinforcement member and the inner panel can be continuous with the hollow side sill by widening the front end portion of wheel arch reinforcement member so as to match with the side sill reinforcement member. Accordingly, strength and rigidity of the fastening section where the side sill reinforcement member and the wheel arch reinforcement member are bonded (i.e., strength and rigidity of the vehicle body) can be secured. Accordingly, for example, when a load is input to the vehicle body due to a lateral collision, the input load can be supported by the fastening section.

(3) In the aspect of the above-mentioned (1) or (2), the side sill reinforcement member may be fastened to the wheel arch reinforcement member at an upper side of a corner section formed in a V-shape at a door opening section.

In this way, on the upper side of the corner section of the door opening section formed in the V shape, the side sill reinforcement member is fastened to the wheel arch reinforcement member. Accordingly, the fastening section where the side sill reinforcement member is fastened to the wheel arch reinforcement member (i.e., a relatively weak area) can be disposed away from the V-shaped corner section. Accordingly, strength and rigidity of the corner section can be secured. Accordingly, for example, when stress is concentrated on the corner section by a load input due to a lateral collision, stress can be supported by the corner section.

(4) In the aspect of the above-mentioned (1) or (2), the side sill reinforcement member may extend along an outer side end of the inner panel to an upper side of a corner section formed in a V-shape at a door opening section and may have a rear end portion fastened to the wheel arch reinforcement member.

In this way, the width dimension of the rear end portion of the side sill reinforcement member can be greatly secured by extending the rear end portion of the side sill reinforcement member along the outer side end of the inner panel until an upper side of the corner section formed in the V shape at the door opening section. The rear end portion is fastened to the wheel arch reinforcement member. Accordingly, fastening of the side sill reinforcement member and the wheel arch reinforcement member can be reinforced, and strength and rigidity of the corner section can be secured. Accordingly, for example, when stress is concentrated on the corner section by a load input due to the lateral collision, stress can be supported by the corner section.

In addition, the fastening section when the side sill reinforcement member and the wheel arch reinforcement member are fastened can be covered with the wheel arch protector from an outer side of the vehicle body, and a good appearance of the vehicle can be maintained.

(5) In the aspect of the above-mentioned (1), the wheel arch reinforcement member may be narrower than the side sill reinforcement member, and the side sill reinforcement member may extend to an upper side of a corner section formed in a V shape at a door opening section and may be fastened to the wheel arch reinforcement member.

In this way, the wheel arch reinforcement member can be formed to have a substantially constant width by making the wheel arch reinforcement member narrower than the side sill reinforcement member. Accordingly, the shape of the wheel arch reinforcement member can be simplified, and productivity of the wheel arch reinforcement member can be increased.

(6) In the aspect of any one of the above-mentioned (1) to (5), the vehicle body side structure may include an inner wheel house disposed at an inner side of the inner panel in a vehicle width direction, and the wheel arch reinforcement member may be disposed at a position opposite to the inner wheel house via the inner panel, and the wheel arch reinforcement member and the inner wheel house are joined in a state in which the inner panel is interposed between the wheel arch reinforcement member and the inner wheel house.

Here, for example, joining the wheel arch reinforcement member to the panel inner flange 36 of the inner panel that forms the edge portion of the door opening section can be considered. However, when the wheel arch reinforcement member is joined to the panel inner flange 36 of the inner panel, the closed cross section (a so-called bag structure) is formed by the wheel arch reinforcement member and the inner panel. For this reason, it is difficult to join the inner wheel house to the inner panel through welding.

Here, in the aspect of the above-mentioned (6), the wheel arch reinforcement member and the inner wheel house are joined in a state in which the inner panel is interposed between the wheel arch reinforcement member and the inner wheel house. Accordingly, the inner wheel house can be joined when the wheel arch reinforcement member is joined to the inner panel. Accordingly, the inner wheel house can be joined to the inner panel through welding without having a risk of being hindered the joining of the inner wheel house to the inner panel by the bag structure formed by the wheel arch reinforcement member and the inner panel.

(7) In the aspect of any one of the above-mentioned (1) to (6), the inner panel may have a wheel arch flange provided at an outer side in the vehicle width direction and to which the outer side panel is joined, and the wheel arch flange may be inclined toward the outer side in the vehicle width direction at a downward gradient.

Here, the wheel arch reinforcement member is disposed at a position opposite to the inner wheel house via the inner panel, the wheel arch reinforcement member and the inner wheel house are joined in a state in which the inner panel is interposed between the wheel arch reinforcement member and the inner wheel house. For this reason, it is conceivable that the wheel arch reinforcement member and the inner panel will approach a wheel (a tire).

Here, in order to avoid an enveloping surface of the tire that represents a moving range of the wheel (i.e., a clearance required for the tire), the wheel arch flange is made to incline toward an outer side in the vehicle width direction at a downward gradient. Accordingly, the inner panel (in particular, the wheel arch flange) can be disposed at a position where the clearance required for the tire is secured.

(8) In the aspect of the above-mentioned (5), the side sill reinforcement member may have a folded flange fastened to the wheel arch reinforcement member at a rear end portion of the side sill reinforcement member.

In this way, the folded flange of the side sill reinforcement member is fastened to the wheel arch reinforcement member. Accordingly, the side sill reinforcement member and the wheel arch reinforcement member can be strongly connected and the side sill reinforcement member can be easily manufactured by using a simple configuration in which the folded flange is formed on the rear end portion of the side sill reinforcement member.

(9) In the aspect of the above-mentioned (5) or (8), the side sill reinforcement member may have a rear end portion extending along the wheel arch reinforcement member and fastened to the wheel arch reinforcement member.

In this way, the side sill reinforcement member and the wheel arch reinforcement member can be strongly connected by extending the rear end portion of the side sill reinforcement member along the wheel arch reinforcement member and fastening the rear end portion of the side sill reinforcement member to the wheel arch reinforcement member. Accordingly, for example, when a load is input to the vehicle body due to a lateral collision and stress is concentrated on the corner section formed in the V shape by the side sill reinforcement member and the inner panel, stress can be supported by the corner section.

In addition, the rear end portion of the side sill reinforcement member extends along the wheel arch reinforcement member and is fastened to the wheel arch reinforcement member. Accordingly, for example, the rear end portion of the side sill reinforcement member and the fastening section of the wheel arch reinforcement member can increase bending rigidity with respect to the load in the upward/downward direction input to the wheel arch reinforcement member.

(10) In the aspect of the above-mentioned (9), the rear end portion of the side sill reinforcement member may include a bulkhead configured to reinforce an area fastened to the wheel arch reinforcement member.

In this way, when the area where the rear end portion of side sill reinforcement member is fastened to the wheel arch reinforcement member is reinforced by the bulkhead, the fastened area can be more strongly fastened. Accordingly, for example, when a load is input to the vehicle body due to a lateral collision and stress is concentrated on the corner section formed in the V shape by the side sill reinforcement member and the inner panel, stress can be supported by the corner section even better.

In addition, for example, the fastening section between the rear end portion of the side sill reinforcement member and the wheel arch reinforcement member can increase bending rigidity with respect to the load in the upward/downward direction input to the wheel arch reinforcement member more appropriately.

Advantageous Effects of Invention

According to the vehicle body side structure of the present invention, when the second fastening member is fastened to the first fastening member from an outer side of the vehicle body, the side panel assembly can be assembled to the floor assembly from an outer side of the vehicle body. Accordingly, in the vehicle including the outer side panel, the wheel arch reinforcement member can be bonded to the side sill reinforcement member from an outer side of the vehicle body.

DESCRIPTION OF EMBODIMENTS

Figure 1:
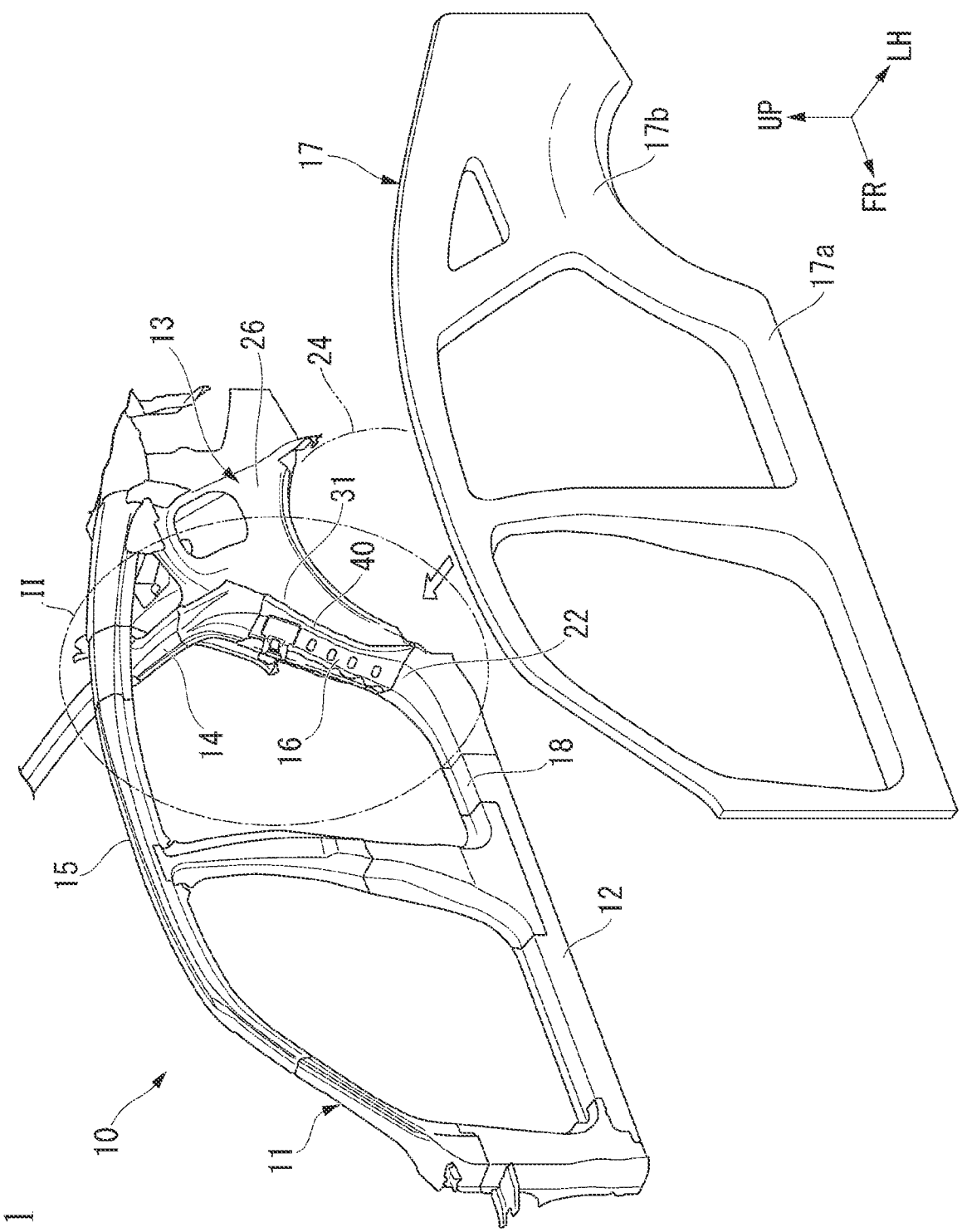
FIG. 1 is an exploded perspective view showing a vehicle body side structure of a first embodiment according to the present invention.

Hereinafter, vehicle body side structures of embodiments of the present invention will be described with reference to the accompanying drawings. In the drawings, an arrow FR indicates a forward direction of a vehicle, an arrow UP indicates an upward direction of the vehicle, and an arrow LH indicates a leftward direction of the vehicle. A vehicle body side structure has a substantially laterally symmetrical configuration, and hereinafter, a left configuration will be described and a description of a right configuration will be omitted.

First Embodiment

Figure 2:
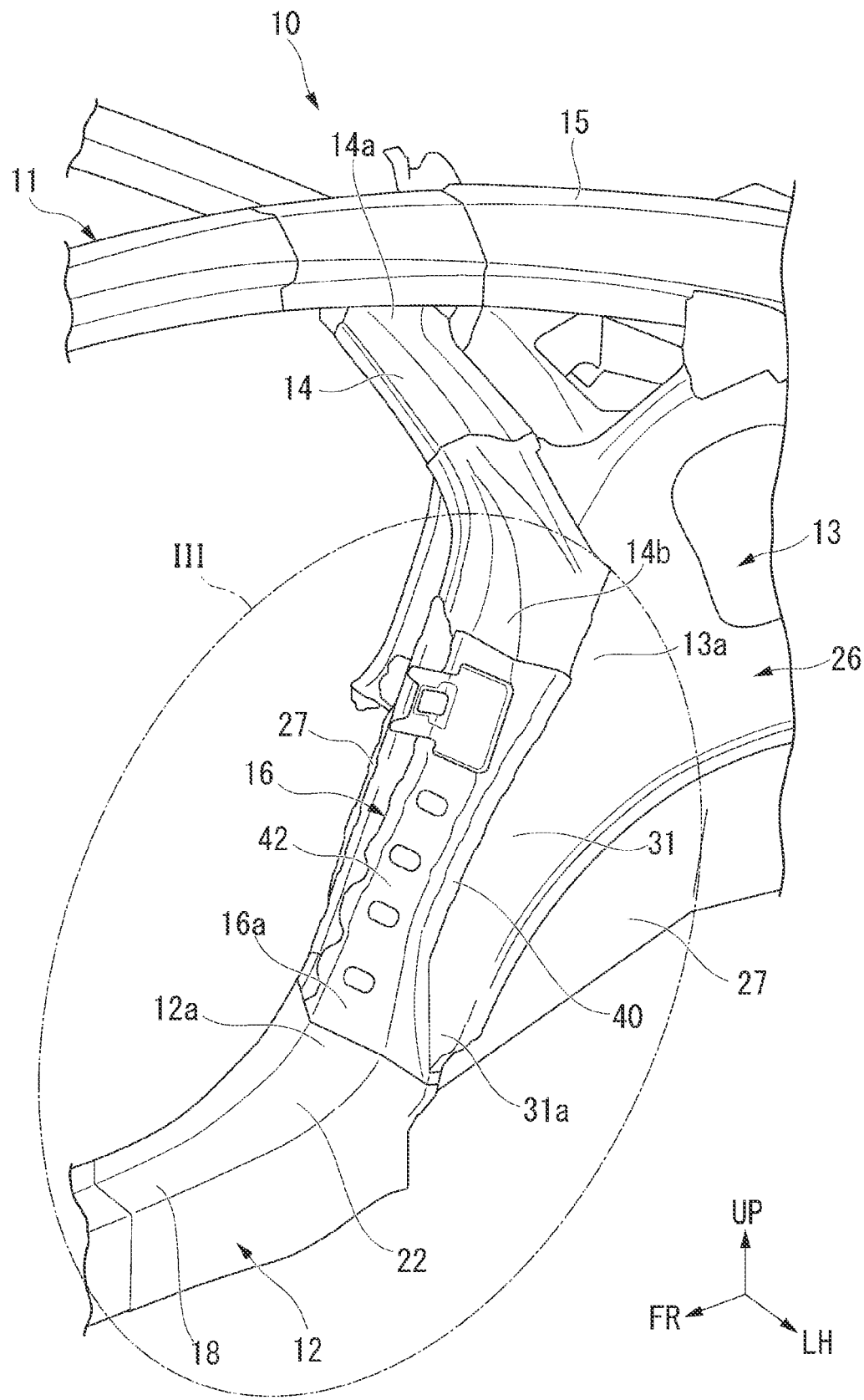
FIG. 2 is an enlarged perspective view of a portion II in FIG. 1.

As shown in FIGS. 1 and 2, a vehicle body side structure 10 includes a side sill 12, a rear wheel house 13, a quarter pillar 14, a roof side rail 15, a wheel arch reinforcement member 16, and an outer side panel 17.

A door opening section 18 is formed in a vehicle body side part 11. A corner section 22 in the door opening section 18 is formed in a V shape when seen in a side view by the side sill 12 and the rear wheel house 13 (specifically, an inner panel front portion 31 (to be described below)). The side sill 12 and the rear wheel house 13 will be described below in detail.

The quarter pillar 14 extends upward in an inclined shape at front of the vehicle body from an upper section 13a of the rear wheel house 13 toward the roof side rail 15. The roof side rail 15 is joined to an upper end portion 14a of the quarter pillar 14 and extends in a vehicle body forward/rearward direction.

The outer side panel 17 is a panel that forms a design surface on an outer side in a vehicle width direction. The outer side panel 17 has a side sill outer panel part 17a and a rear wheel outer section 17b.

The rear wheel house 13 is formed to cover a rear tire 24 from above. The rear wheel house 13 includes an inner panel (an outer of rear wheel house) 26 and an inner of rear wheel house (an inner of wheel house) 27 (see also FIG. 4). The inner panel 26 is formed to cover the rear tire 24 from above and outside. The inner panel 26 has the inner panel front portion 31 that forms a rearward inclination section of the door opening section 18. The inner panel front portion 31 has a front end portion 31a that is joined to a rear end portion 12a of the side sill 12.

Figure 3:
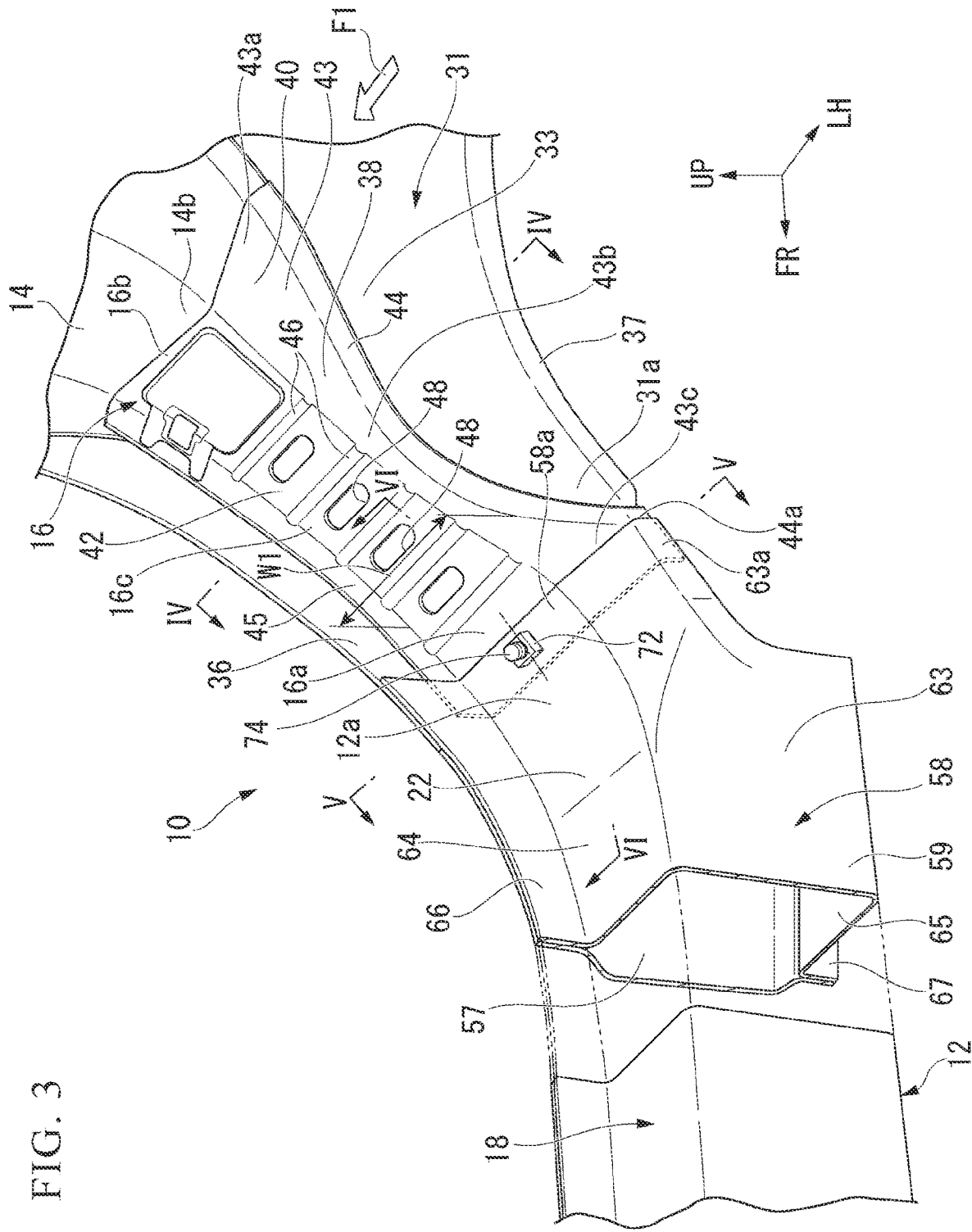
FIG. 3 is an enlarged perspective view of a portion III in FIG. 2.
Figure 4:
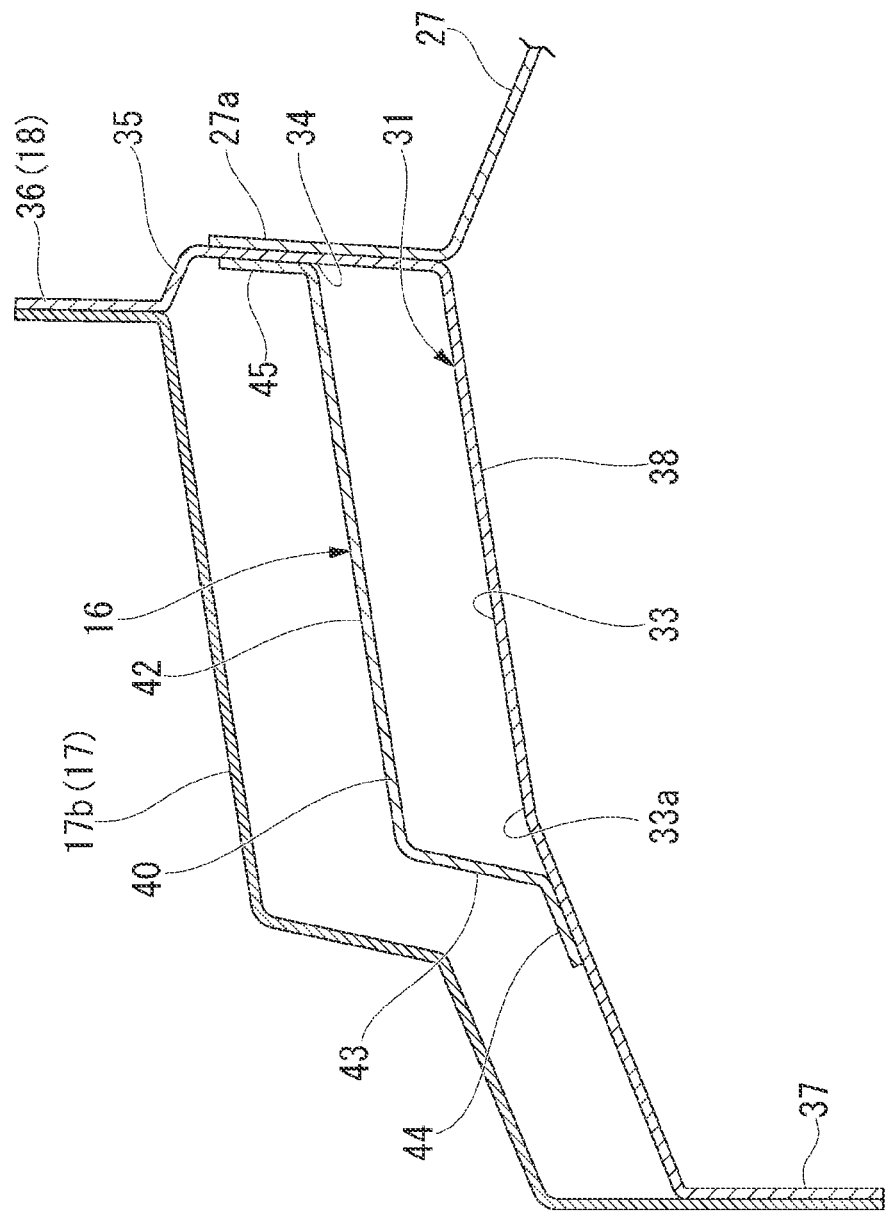
FIG. 4 is a cross-sectional view showing a state in which an outer side panel is attached to a cross section along line IV-IV in FIG. 3.
Figure 4:
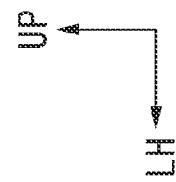

As shown in FIGS. 3 and 4, the inner panel front portion 31 has a panel front section 33, a panel inner standing upper section 34, a panel inner folding section 35, a panel inner flange 36, and a panel outer flange (a wheel arch flange) 37.

The panel front section 33 extends toward a rear upper side of the vehicle body from the rear end portion 12a of the side sill 12 to a lower end portion 14b of the quarter pillar 14 while being disposed in the vehicle width direction. The panel front section 33 is folded in a protrusion shape such that a center 33a protrudes upward in the vehicle width direction.

The panel inner standing upper section 34 stands upward in a substantially vertical direction from an inner side of the panel front section 33. The panel inner folding section 35 is folded outward from an upper side of the panel inner standing upper section 34 in the vehicle width direction. The panel inner flange 36 overhangs upward from an outer side of the panel inner folding section 35. The panel inner flange 36 forms an edge portion of the door opening section 18. In addition, the panel outer flange 37 overhangs downward from an outer side of the panel front section 33.

An inner flange 27a of the inner of rear wheel house 27 is joined to the panel inner standing upper section 34 of the inner panel front portion 31 from an inner side in the vehicle width direction. The inner of rear wheel house 27 is disposed inside of the inner panel front portion 31 (i.e., the inner panel 26 (see FIG. 1)) in the vehicle width direction, and formed to cover the rear tire 24 (see FIG. 1) from above and inside.

In addition, the wheel arch reinforcement member 16 overlaps the inner panel front portion 31 in front of the vehicle body from diagonally above. Accordingly, a hollow structure 38 (see also FIG. 6) of a closed cross section is formed by the inner panel front portion 31 and the wheel arch reinforcement member 16.

The wheel arch reinforcement member 16 has a front end portion 16a that is joined to the rear end portion 12a of the side sill 12, and extends diagonally along the inner panel front portion 31 toward a rearward and upper side of the vehicle body. The wheel arch reinforcement member 16 has an arch reinforcement apex section 42, an arch reinforcement leg section 43, an arch reinforcement outer flange 44, an arch reinforcement inner flange 45, and a plurality of beads 46.

The arch reinforcement apex section 42 extends diagonally toward a rear upper side of the vehicle body from the front end portion 31a of the inner panel front portion 31 to the lower end portion 14b of the quarter pillar 14 along the panel front section 33. In this state, the arch reinforcement apex section 42 is disposed while having an interval with the panel front section 33 at a front upper side of the vehicle body. A plurality of openings 48 are formed in the arch reinforcement apex section 42 toward a rear end portion 16b from the front end portion 16a of the wheel arch reinforcement member 16 while having intervals with each other. The beads 46 are formed between the neighboring openings 48 in the vehicle width direction.

For example, the beads 46 are formed in an area that rises upward from the arch reinforcement apex section 42. Accordingly, the arch reinforcement apex section 42 can be reinforced by the plurality of beads 46 with respect to a load F1 input due to a lateral collision of the vehicle, and strength of the arch reinforcement apex section 42 can be secured.

The arch reinforcement leg section 43 is formed integrally with an outer side of the arch reinforcement apex section 42. Specifically, the arch reinforcement leg section 43 has an area from a rear end portion 43a to a center 43b, and the arch reinforcement leg section 43 overhangs downward from an outer side of the arch reinforcement apex section 42 to the panel front section 33.

Figure 5:
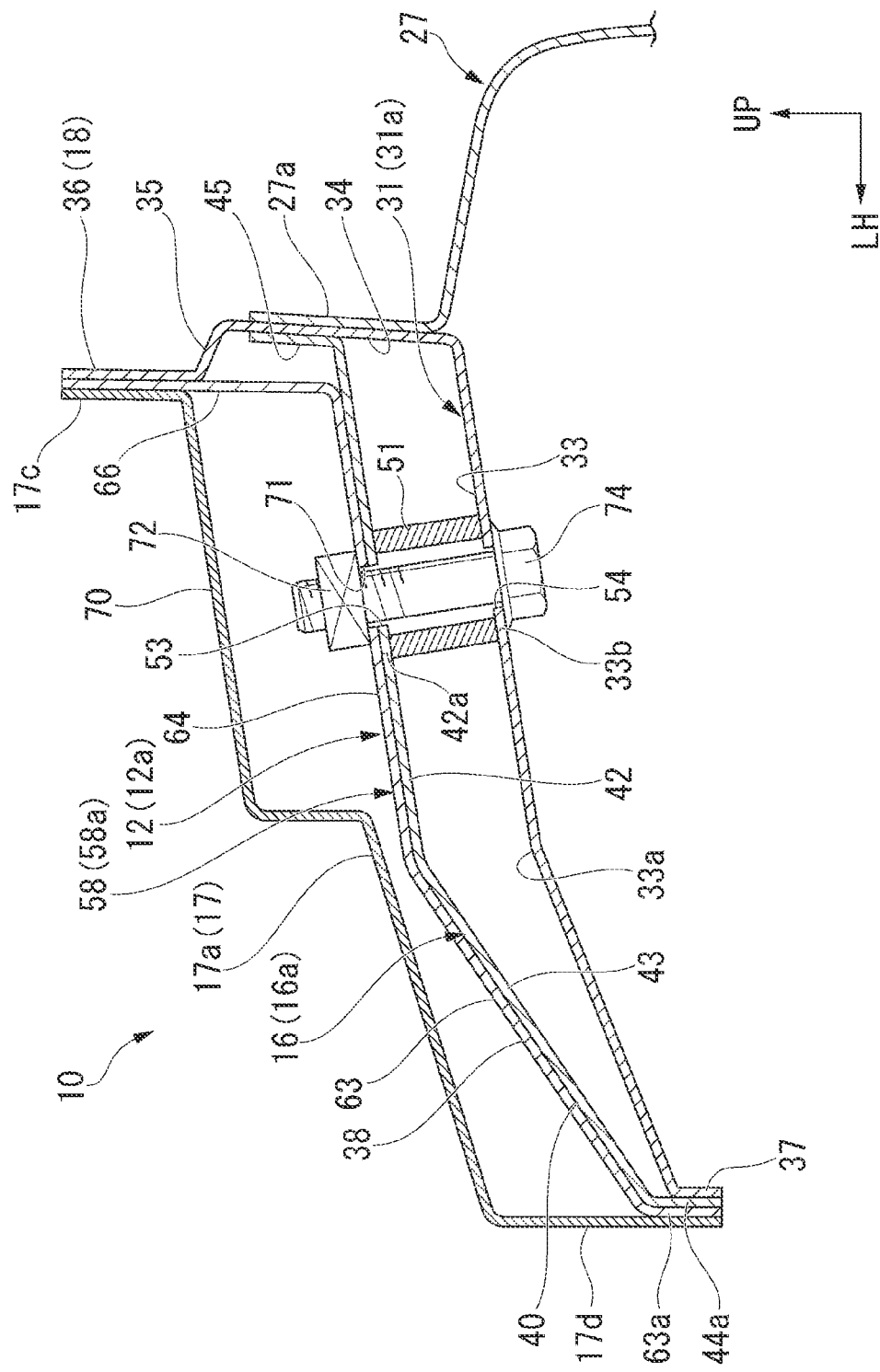
FIG. 5 is a cross-sectional view showing a state in which the outer side panel is attached to a cross section along line V-V in FIG. 3.

In addition, the arch reinforcement leg section 43 has an area from the center 43b to a front end portion 43c that is formed with a downward gradient from the outer side of the arch reinforcement apex section 42 toward an outer side in the vehicle width direction (see FIG. 5).

Accordingly, the arch reinforcement apex section 42 and the arch reinforcement leg section 43 have a width dimension W1 that is gradually increased toward a front side of the vehicle body from a center 16c of the wheel arch reinforcement member 16 to the front end portion 16a.

The width dimension W1 of the arch reinforcement apex section 42 and the arch reinforcement leg section 43 is "the width dimension W1 of the wheel arch reinforcement member 16."

That is, the wheel arch reinforcement member 16 has the width dimension W1 that is gradually increased from the center 16c to the front end portion 16a, and the front end portion 16a is formed to match a width dimension of a side sill reinforcement member 58 (to be described below) (see FIG. 5). The arch reinforcement outer flange 44 overhangs from a lower side of the arch reinforcement leg section 43 toward an outer side in the vehicle width direction along the panel front section 33. The arch reinforcement outer flange 44 is joined to the panel front section 33.

As shown in FIGS. 3 and 5, a front end portion 44a of the arch reinforcement outer flange 44 overhangs downward from the lower side of the arch reinforcement leg section 43 along the panel outer flange 37 of the inner panel front portion 31. The front end portion 44a of the arch reinforcement outer flange 44 is joined to the panel outer flange 37.

The arch reinforcement inner flange 45 overhangs upward from the inner side of the arch reinforcement apex section 42 along the panel inner standing upper section 34. The arch reinforcement inner flange 45 is disposed at a position opposite to the inner flange 27a via the panel inner standing upper section 34, and joined to the panel inner standing upper section 34 and the inner flange 27a. In other words, the panel inner standing upper section 34 is joined to the arch reinforcement inner flange 45 and the inner flange 27a while being sandwiched therebetween.

In this way, the arch reinforcement outer flange 44 is joined to the panel front section 33, and the front end portion 44a of the arch reinforcement outer flange 44 is joined to the panel outer flange 37. In addition, the arch reinforcement inner flange 45 is joined to the panel inner standing upper section 34 from an outer side in the vehicle width direction. Accordingly, a floor assembly 40 is formed in a closed cross section by the wheel arch reinforcement member 16 and the inner panel front portion 31.

In the floor assembly 40, a collar 51 is interposed between an arch attachment area 42a of the arch reinforcement apex section 42 and a panel attachment area 33b of the panel front section 33. That is, in the floor assembly 40, the wheel arch reinforcement member 16 is fixed to the inner panel front portion 31, and the collar 51 is interposed between the wheel arch reinforcement member 16 and the inner panel front portion 31. For example, the collar 51 is fixed to one of the wheel arch reinforcement member 16 and the inner panel front portion 31.

The arch attachment area 42a is an area in the front end portion of the arch reinforcement apex section 42 at a center in the vehicle width direction. The arch attachment hole 53 is formed in the arch attachment area 42a. The panel attachment area 33b is an area in the panel front section 33 opposite to the arch attachment area 42a. A panel attachment hole 54 is formed in the panel attachment area 33b. In a state in which the collar 51 is interposed between the arch attachment area 42a and the panel attachment area 33b, the collar 51, the arch attachment hole 53 and the panel attachment hole 54 are disposed coaxially.

In a state in which the wheel arch reinforcement member 16 is joined along the inner panel front portion 31, the rear end portion 12a of the side sill 12 is provided on the front end portion 16a of the wheel arch reinforcement member 16.

For example, the side sill 12 is disposed on a left outer side of the vehicle body in the vehicle width direction, and extends from the front end portion 16a of the wheel arch reinforcement member 16 in a forward direction of the vehicle body. The side sill 12 includes an inner side sill 57, a side sill reinforcement member 58, and the side sill outer panel part 17a (see FIG. 1).

The side sill 12 is formed in a hollow rectangular closed cross section 59 by the inner side sill 57 and the side sill reinforcement member 58. Hereinafter, the rectangular closed cross section 59 is referred to as "the side sill closed cross section 59."

The side sill reinforcement member 58 has a side sill reinforcement outer wall 63, a side sill reinforcement upper wall 64, a side sill reinforcement lower wall 65, a side sill reinforcement upper flange (a folded flange) 66, and a side sill reinforcement lower flange 67.

The side sill reinforcement upper wall 64 overhangs from the upper side of the side sill reinforcement outer wall 63 toward an inner side in the vehicle width direction (i.e., the side of the inner side sill 57). The side sill reinforcement lower wall 65 overhangs from the lower side of the side sill reinforcement outer wall 63 toward an inner side in the vehicle width direction (i.e., the side of the inner side sill 57). The side sill reinforcement upper flange 66 overhangs upward from the inner side of the side sill reinforcement upper wall 64. The side sill reinforcement lower flange 67 overhangs downward from the inner side of the side sill reinforcement lower wall 65.

The side sill reinforcement member 58 is formed in a cross-sectional hat shape by the side sill reinforcement outer wall 63, the side sill reinforcement upper wall 64, the side sill reinforcement lower wall 65, the side sill reinforcement upper flange 66, and the side sill reinforcement lower flange 67. The side sill reinforcement upper flange 66 and the side sill reinforcement lower flange 67 are joined to each other while overlapping the inner side sill 57 from an outer side in the vehicle width direction. Accordingly, in the side sill 12, the side sill closed cross section 59 is formed in a rectangular shape by the side sill reinforcement member 58 and the inner side sill 57.

Here, a rear end portion 58a of the side sill reinforcement member 58 extends to the front end portion 16a of the wheel arch reinforcement member 16 toward a rear upper side of the vehicle body. Accordingly, the rear end portion 58a of the side sill reinforcement member 58 extends with respect to the corner section 22 formed in a V shape in the door opening section 18 toward a rear upper side of the vehicle body. The rear end portion 58a of the side sill reinforcement member 58 is formed to roughly follow the front end portion 16a of the wheel arch reinforcement member 16. Accordingly, the rear end portion 58a of the side sill reinforcement member 58 extending to the front end portion 16a of the wheel arch reinforcement member 16 is disposed to overlap the front end portion 16a from an outer side (an upper side) of the vehicle body.

Specifically, the rear end portion 58a of the side sill reinforcement member 58 flatly extends from the side sill reinforcement upper wall 64 to the arch reinforcement apex section 42 toward a rear upper side of the vehicle body. A side sill attachment hole 71 is formed at a center of the side sill reinforcement upper wall 64 in the vehicle width direction. A fastening nut (a first fastening member) 72 is fixed to a surface of the side sill reinforcement upper wall 64 opposite to the side sill outer panel part 17a (see FIG. 1) at a position corresponding to the side sill attachment hole 71 through welding.

In addition, in the rear end portion 58a of the side sill reinforcement member 58, the side sill reinforcement outer wall 63 extends to the front end portion 43c of the arch reinforcement leg section 43 and the front end portion 44a of the arch reinforcement outer flange 44 toward a rear upper side of the vehicle body. In the rear end portion 58a of the side sill reinforcement member 58, the side sill reinforcement outer wall 63 has an outer end portion 63a that is bent downward along the front end portion 44a of the arch reinforcement outer flange 44. The outer end portion 63a of the side sill reinforcement outer wall 63 is joined to the front end portion 44a of the arch reinforcement outer flange 44 from an outer side of the vehicle body.

Further, in the rear end portion 58a of the side sill reinforcement member 58, the side sill reinforcement upper flange 66 extends to the panel inner flange 36 of the inner panel front portion 31 toward a rear upper side of the vehicle body. The side sill reinforcement upper flange 66 is joined to the panel inner flange 36 of the inner panel front portion 31 from an outer side of the vehicle body.

In addition, an outer panel inner flange 17c of the side sill outer panel part 17a is joined to the side sill reinforcement upper flange 66 from an outer side of the vehicle body. Further, an outer panel outer flange 17d of the side sill outer panel part 17a is joined to the outer end portion 63a of the side sill reinforcement outer wall 63 from an outer side of the vehicle body. Accordingly, the side sill outer panel part 17a is fixed to (the rear end portion 58a of) the side sill reinforcement member 58 and they overlap each other from an outer side of the vehicle body.

In this state, a side panel assembly 70 is constituted by the side sill reinforcement member 58 and the side sill outer panel part 17a. In other words, in the side panel assembly 70, the side sill outer panel part 17a is fixed to the side sill reinforcement member 58, and the fastening nut 72 is provided on a surface of the rear end portion 58a of the side sill reinforcement members 58 on the side of the side sill outer panel part 17a.

When the side panel assembly 70 is fixed to the floor assembly 40 from an outer side of the vehicle body, the rear end portion 58a of the side sill reinforcement member 58 is disposed on the front end portion 16a of the wheel arch reinforcement member 16 while overlapping each other from an outer side of the vehicle body. In this state, the rear end portion 58a of the side sill reinforcement member 58 is disposed following the front end portion 16a of the wheel arch reinforcement member 16. In addition, the collar 51 is coaxially disposed at a position of the side sill reinforcement upper wall 64 corresponding to the fastening nut 72.

A fastening bolt 74 (a second fastening member) is fastened to the fastening nut 72 via the panel attachment hole 54, the collar 51, the arch attachment hole 53 and the side sill attachment hole 71 from an outer side of the vehicle body. Accordingly, the side panel assembly 70 is attached to the floor assembly 40 from an outer side of the vehicle body.

In other words, in the vehicle including the outer side panel 17, the front end portion 16a of the wheel arch reinforcement member 16 can be reliably (strongly) bonded to the rear end portion 58a of the side sill reinforcement member 58 by the fastening nut 72 and the fastening bolt 74 from an outer side of the vehicle body.

Here, the corner section 22 of the door opening section 18 is formed in a V shape by the side sill 12 and the inner panel front portion 31. For this reason, for example, it is conceivable that stress is concentrated on the corner section 22 when a load is input to the vehicle body due to a lateral collision.

Here, the rear end portion 58a of the side sill reinforcement member 58 extends with respect to the corner section 22 in a rearward and upward direction of the vehicle body. Accordingly, a fastening section where the rear end portion 58a of the side sill reinforcement member 58 and the front end portion 16a of the wheel arch reinforcement member 16 are fastened by using the fastening bolt 74 and the fastening nut 72 can be separated from the corner section 22. In addition, the front end portion 16a of the wheel arch reinforcement member 16 and the rear end portion 58a of the side sill reinforcement member 58 can be reliably (strongly) bonded by the fastening nut 72 and the fastening bolt 74.

Accordingly, for example, when the load F1 is input to the vehicle body due to a lateral collision and stress is concentrated on the corner section 22 formed in the V shape by the side sill 12 and the inner panel front portion 31, stress can be supported by the corner section 22.

In addition, it is conceivable that the fastening section where the rear end portion 58a of the side sill reinforcement member 58 and the front end portion 16a of the wheel arch reinforcement member 16 are fastened by using the fastening bolt 74 and the fastening nut 72 is a relatively weak area. Then, the fastening section to be fastened with the fastening bolt 74 and the fastening nut 72 is placed away from the corner section 22. Accordingly, stress and rigidity of the corner section 22 formed in the V shape can be secured. Accordingly, for example, when stress is concentrated on the corner section 22 by the load F1 input due to a lateral collision, stress can be supported by the corner section 22.

In addition, the rear end portion 58a of the side sill reinforcement member 58 extends to an upper side of the corner section 22 along the front end portion 44a of the arch reinforcement outer flange 44. The front end portion 44a of the arch reinforcement outer flange 44 is joined to the panel outer flange (an outer side end of the inner panel) 37 from an outer side in the vehicle width direction. Accordingly, the rear end portion 58a of the side sill reinforcement member 58 extends along the panel outer flange 37, and a width dimension is largely secured. Accordingly, the width dimension W1 of the front end portion 16a of the wheel arch reinforcement member 16 is increased to match the rear end portion 58a of the side sill reinforcement member 58. The rear end portion 58a of the side sill reinforcement member 58 is fastened to the widened front end portion 16a.

Accordingly, fastening between the rear end portion 58a of the side sill reinforcement member 58 and the front end portion 16a of the wheel arch reinforcement member 16 can be strengthened, and stress and rigidity of the corner section 22 can be secured. Accordingly, for example, when stress is concentrated on the corner section 22 by the load F1 input due to a lateral collision, stress can be supported by the corner section 22.

In addition, the fastening section between the rear end portion 58a of the side sill reinforcement member 58 and the front end portion 16a of the wheel arch reinforcement member 16 can be covered with a wheel arch protector (not shown) from an outer side of the vehicle body, and appearance of the vehicle can be kept good.

Figure 6:
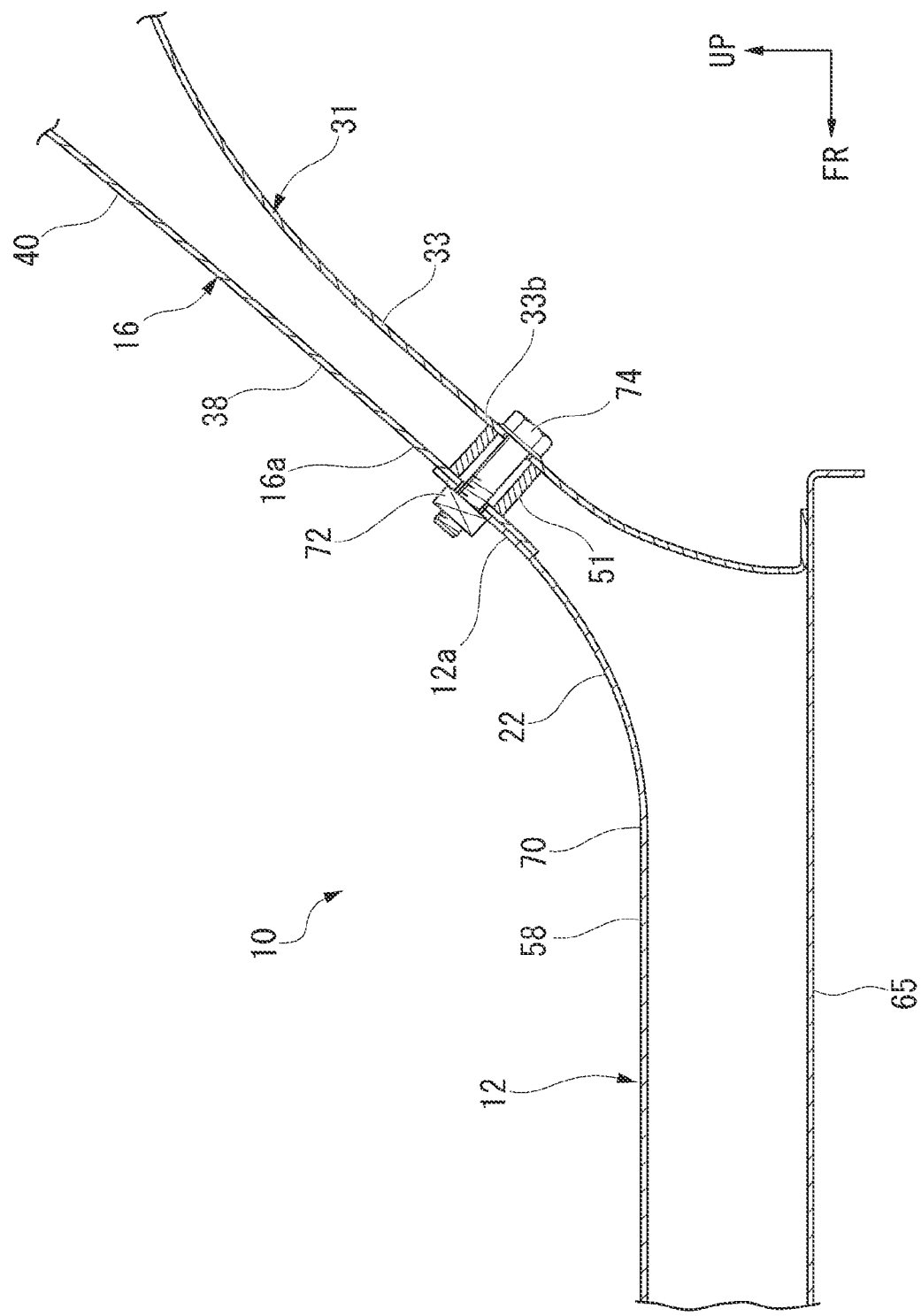
FIG. 6 is a cross-sectional view along line VI-VI in FIG. 3.

As shown in FIG. 6, the hollow structure 38 is formed by the inner panel front portion 31 and the wheel arch reinforcement member 16. In addition, the side sill closed cross section 59 is formed by the inner side sill 57 and the side sill reinforcement member 58. Further, the front end portion 16a of the wheel arch reinforcement member 16 has the width dimension W1 (see FIG. 3) that is increased to match the shape of the rear end portion 58a of the side sill reinforcement member 58.

Accordingly, when the side panel assembly 70 is attached to the floor assembly 40, the hollow structure 38 is continuous with the side sill closed cross section 59. Accordingly, strength and rigidity of the fastening section where the rear end portion 58a of the side sill reinforcement member 58 and the front end portion 16a of the wheel arch reinforcement member 16 are fastened (i.e., strength and rigidity of the vehicle body) can be secured. Accordingly, for example, when the load F1 (see FIG. 3) is input to the vehicle body due to a lateral collision, the input load F1 can be supported by the fastening section between the rear end portion 58a of the side sill reinforcement member 58 and the front end portion 16a of the wheel arch reinforcement member 16.

In addition, when the hollow structure 38 is formed by the inner panel front portion 31 and the wheel arch reinforcement member 16, the rear end portion 58a of the side sill reinforcement member 58 can be strongly bonded (supported) by the hollow structure 38. Accordingly, it is possible to generate sufficient reaction force against the load F1 due to a lateral collision of the vehicle.

Next, a sequence of assembling the side panel assembly 70 to the floor assembly 40 will be described with reference to FIG. 7.

Figure 7:
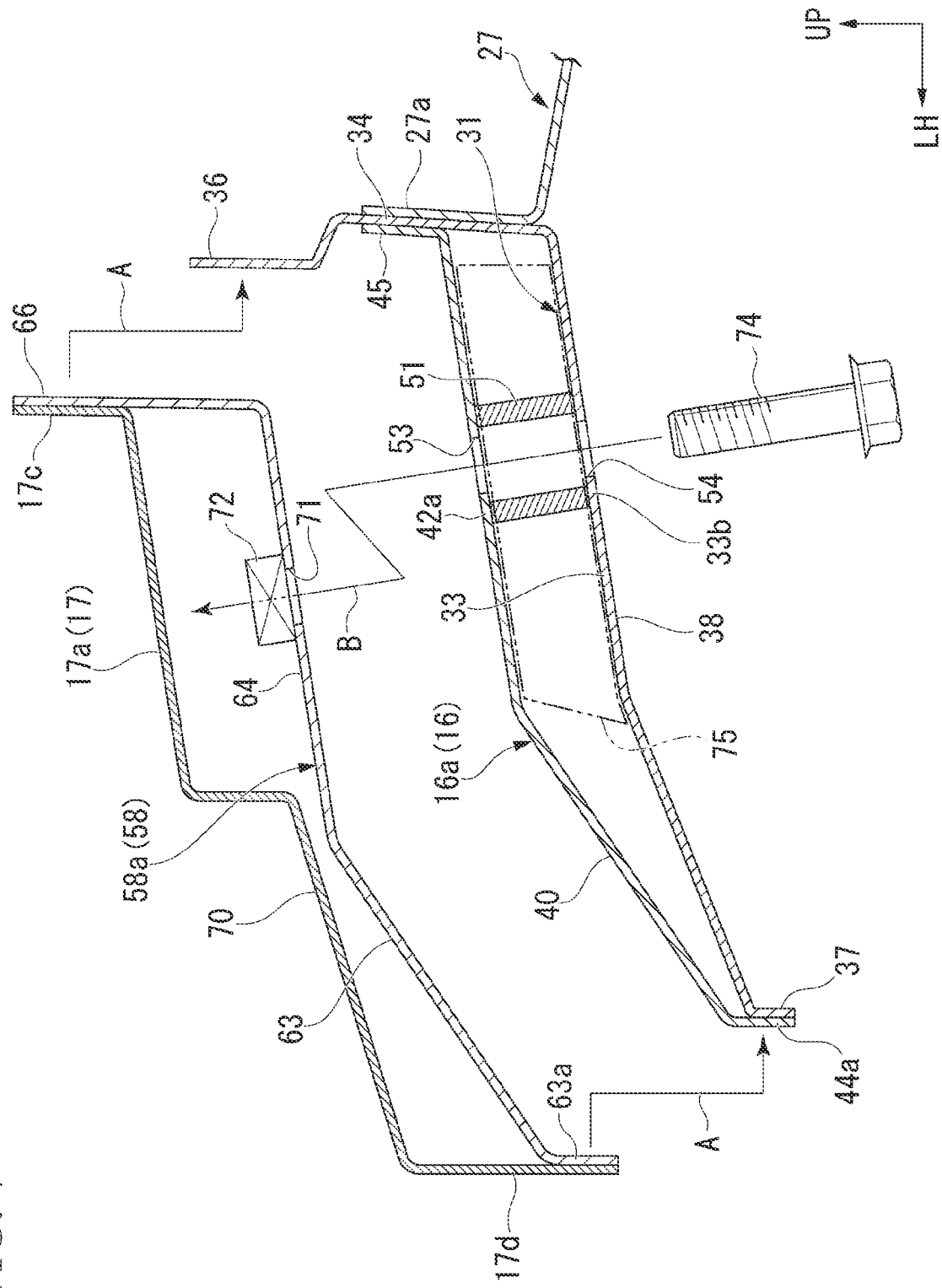
FIG. 7 is a cross-sectional view for describing a sequence of assembling a side panel assembly to a floor assembly of the first embodiment.

As shown in FIG. 7, for example, the collar 51 is fixed to one of the panel attachment area 33b of the inner panel front portion 31 and the arch attachment area 42a of the wheel arch reinforcement member 16 through welding. Next, the wheel arch reinforcement member 16 is joined to the inner panel front portion 31 through welding.

Specifically, the arch reinforcement outer flange 44 (see FIG. 3) of the wheel arch reinforcement member 16 is joined to the panel front section 33, and the front end portion 44a of the arch reinforcement outer flange 44 is joined to the panel outer flange 37.

In addition, in a state in which the panel inner standing upper section 34 is sandwiched between the arch reinforcement inner flange 45 and the inner flange 27a, the arch reinforcement inner flange 45, the panel inner standing upper section 34 and the inner flange 27a are joined.

Here, for example, it is also conceivable that the arch reinforcement inner flange 45 is joined to the panel inner flange 36 of the inner panel front portion 31. However, when the arch reinforcement inner flange 45 is joined to the panel inner flange 36, an inner surface of the panel inner standing upper section 34 is disposed inside of the closed cross section (a so-called bag structure) formed by the inner panel front portion 31 and the wheel arch reinforcement member 16. For this reason, it is difficult to join the inner flange 27a to the panel inner standing upper section 34 through, for example, spot welding or the like.

Therefore, the arch reinforcement inner flange 45 is disposed at a position opposite to the inner flange 27a via the panel inner standing upper section 34. Accordingly, there is no risk of hindering the joining of the inner flange 27a to the panel inner standing upper section 34 by a bag structure formed by the inner panel front portion 31 and the wheel arch reinforcement member 16. Accordingly, the arch reinforcement inner flange 45, the panel inner standing upper section 34 and the inner flange 27a can be joined through spot welding or the like.

In this case, when the wheel arch reinforcement member 16 is joined to the inner panel front portion 31 through welding, the floor assembly 40 is formed by the inner panel front portion 31 and the wheel arch reinforcement member 16. In the floor assembly 40, the collar 51 is interposed between the arch attachment area 42a and the panel attachment area 33b. The collar 51 is disposed coaxially with the arch attachment hole 53 and the panel attachment hole 54.

Here, the hollow structure 38 is formed by the inner panel front portion 31 and the wheel arch reinforcement member 16. Here, in the hollow structure 38, a bulkhead 75 can be provided in the vicinity of the front end portion 16a of the wheel arch reinforcement member 16 and on a further rear upper side of the vehicle body than the front end portion 16a. Accordingly, strength and rigidity of the hollow structure 38 can be increased by the bulkhead 75, and for example, deformation or the like of the floor assembly 40 can be minimized Next, in the surface of the rear end portion 58a of the side sill reinforcement member 58, the fastening nut 72 is fixed to a position corresponding to the side sill attachment hole 71 through welding. Next, the side sill outer panel part 17a is fixed to the rear end portion 58a of the side sill reinforcement member 58 through welding. Accordingly, the side panel assembly 70 is formed by the side sill reinforcement member 58 and the side sill outer panel part 17a.

Next, the side panel assembly 70 is attached to the floor assembly 40 from an outer side of the vehicle body like an arrow A. Accordingly, the rear end portion 58a of the side sill reinforcement member 58 is disposed following the front end portion 16a of the wheel arch reinforcement member 16. In this state, the fastening nut 72 is disposed coaxially with the collar 51.

Next, the fastening bolt 74 is fastened to the fastening nut 72 via the panel attachment hole 54, the collar 51, the arch attachment hole 53 and the side sill attachment hole 71 from an outer side of the vehicle body like an arrow B. Accordingly, the side panel assembly 70 can be assembled to the floor assembly 40 from an outer side of the vehicle body (see FIG. 5). Accordingly, the rear end portion 58a of the side sill reinforcement member 58 can be strongly bonded to the front end portion 16a of the wheel arch reinforcement member 16 by the fastening bolt 74 and the fastening nut 72.

Further, in this state, the rear wheel outer section 17b (see FIG. 1) is joined to the inner panel 26 (see FIG. 1) from an outer side in the vehicle width direction. Accordingly, a closed cross section is formed by the inner panel 26 and the rear wheel outer section 17b.

Second Embodiment

Figure 8:
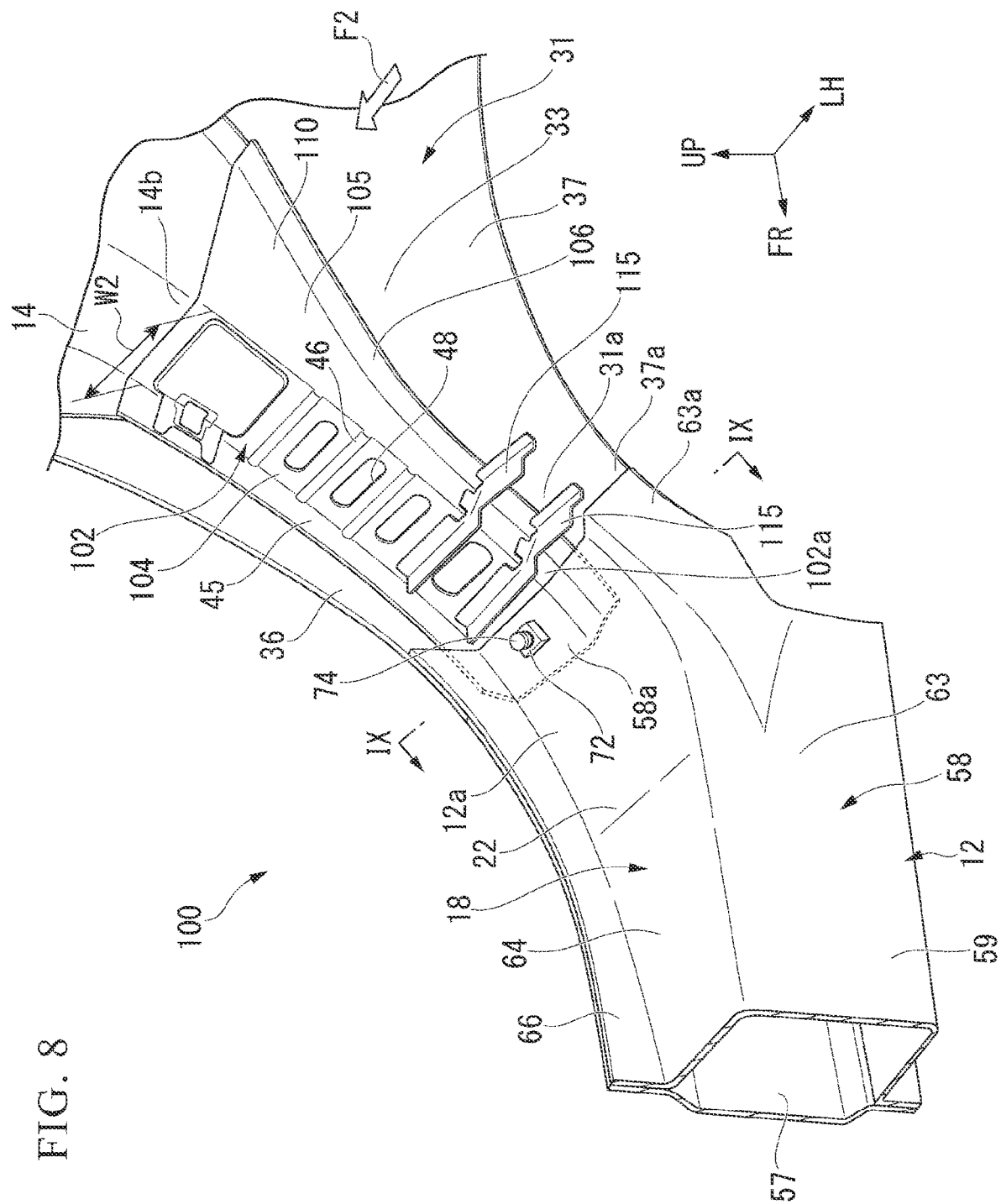
FIG. 8 is an exploded perspective view showing a vehicle body side structure of a second embodiment according to the present invention.
Figure 9:
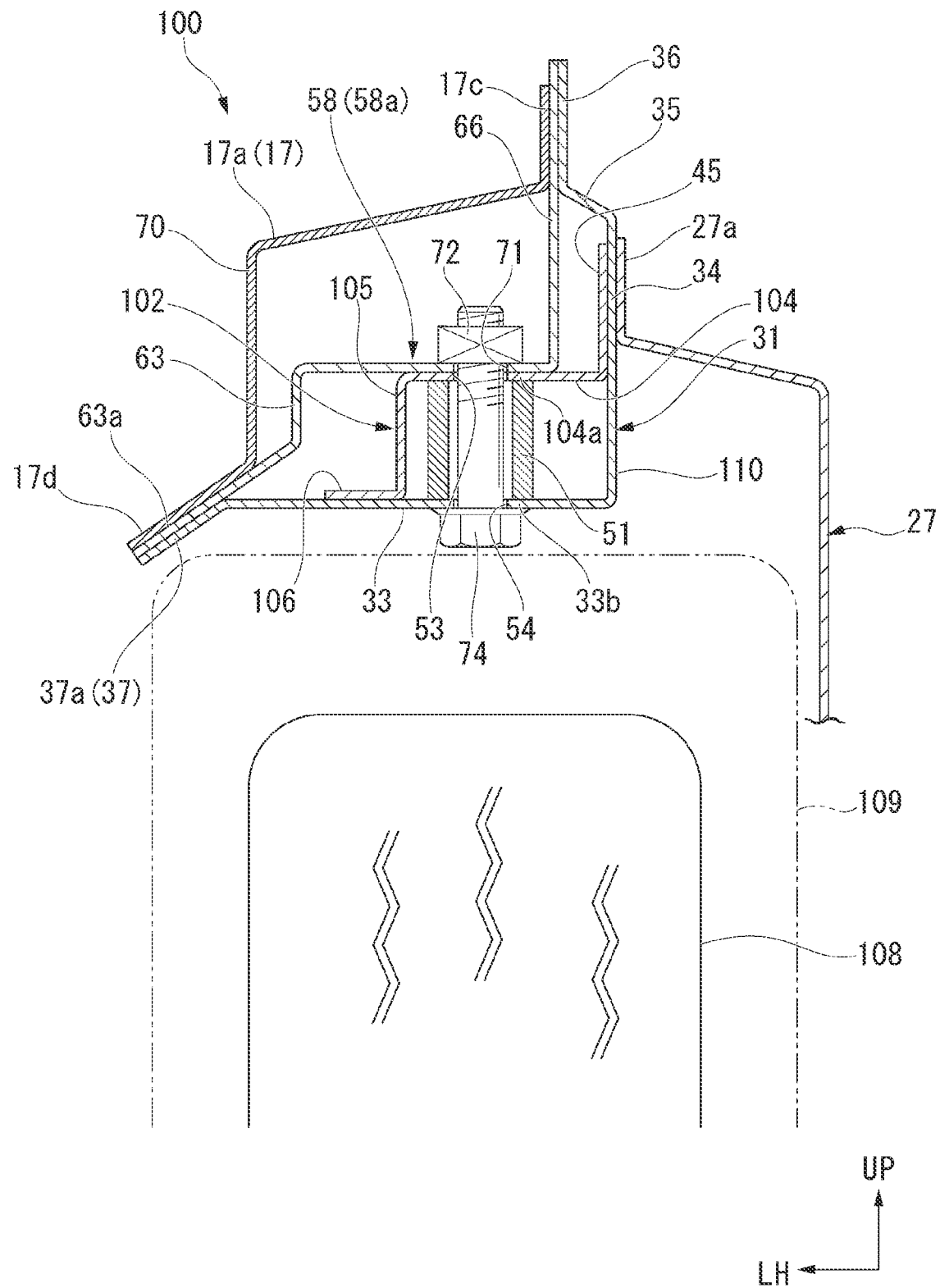
FIG. 9 is a cross-sectional view showing a state in which an outer side panel is attached to a cross section along line IX-IX in FIG. 8.

Next, a vehicle body side structure 100 of a second embodiment will be described with reference to FIGS. 8 and 9. Further, in the second embodiment, components of the same or similar members as the vehicle body side structure 10 of the first embodiment are designated by the same reference signs, and detailed description thereof will be omitted.

The vehicle body side structure 100 includes a wheel arch reinforcement member 102 instead of the wheel arch reinforcement member 16 of the first embodiment. In addition, in the vehicle body side structure 100, the panel outer flange 37 of the inner panel front portion 31 overhangs diagonally downward from the outer side of the panel front section 33 toward a lower side. The panel outer flange 37 is provided on an outer side in the vehicle width direction, and the side sill outer panel part 17a of the outer side panel 17 is joined to a front end portion 37a via the outer end portion 63a of the side sill reinforcement outer wall 63.

The wheel arch reinforcement member 102 has a front end portion 102a that is joined to the rear end portion 12a of the side sill 12, and extends diagonally along the inner panel front portion 31 toward a rear upper side of the vehicle body.

The wheel arch reinforcement member 102 has an arch reinforcement apex section 104, an arch reinforcement leg section 105, an arch reinforcement outer flange 106, an arch reinforcement inner flange 45, and a plurality of beads 46.

The arch reinforcement inner flange 45 is disposed at a position opposite to the inner flange 27a via the panel inner standing upper section 34. Accordingly, there is no risk of hindering the joining of the inner flange 27a to the panel inner standing upper section 34 due to the closed cross section (a so-called bag structure) formed by the inner panel front portion 31 and the wheel arch reinforcement member 102. Accordingly, the arch reinforcement inner flange 45, the panel inner standing upper section 34 and the inner flange 27a are joined through spot welding or the like.

Here, it is conceivable that the inner panel front portion 31 or the wheel arch reinforcement member 102 approaches a wheel (a tire) 108 by disposing the arch reinforcement inner flange 45 at a position opposite to the inner flange 27a via the panel inner standing upper section 34. Here, the panel outer flange 37 of the inner panel front portion 31 overhangs diagonally downward from the outer side of the panel front section 33 toward a lower side. Accordingly, it is possible to avoid an enveloping surface 109 (i.e., a clearance required for the wheel 108) of the tire that represents a moving range of the wheel 108.

Accordingly, it is possible to dispose the panel outer flange 37 at a position where the clearance required for the wheel 108 is secured.

In addition, the arch reinforcement apex section 104 extends diagonally from the front end portion 31a of the inner panel front portion 31 to the lower end portion 14b of the quarter pillar 14 along the panel front section 33 toward a rear upper side of the vehicle body. The arch reinforcement apex section 104 is formed to have a substantially constant width such that a width dimension W2 in the vehicle width direction is reduced to be smaller than the rear end portion 58a of the side sill reinforcement member 58.

Accordingly, the wheel arch reinforcement member 102 can be formed to have a substantially constant width. Accordingly, the shape of the wheel arch reinforcement member 102 can be simplified, and productivity of the wheel arch reinforcement member 102 can be increased.

The arch reinforcement leg section 105 is formed integrally with the outer side of the arch reinforcement apex section 104. Specifically, in the arch reinforcement leg section 105, the arch reinforcement leg section 43 overhangs downward from the outer side of the arch reinforcement apex section 42 to the panel front section 33. The arch reinforcement outer flange 106 overhangs outward from the lower side of the arch reinforcement leg section 105 in the vehicle width direction along the panel front section 33. The arch reinforcement outer flange 106 is joined to the panel front section 33.

The arch reinforcement inner flange 45 overhangs upward from the inner side of the arch reinforcement apex section 104 along the panel inner standing upper section 34. The arch reinforcement inner flange 45 is joined to the panel inner standing upper section 34 from an outer side in the vehicle width direction.

In this way, the arch reinforcement outer flange 44 is joined to the panel front section 33. In addition, the arch reinforcement inner flange 45 is joined to the panel inner standing upper section 34 from an outer side in the vehicle width direction.

Accordingly, a floor assembly 110 is formed in a closed cross section by the wheel arch reinforcement member 102 and the inner panel front portion 31.

In the floor assembly 110, the collar 51 is interposed between an arch attachment area 104a of the arch reinforcement apex section 104 and the panel attachment area 33b of the panel front section 33. That is, in the floor assembly 110, the wheel arch reinforcement member 102 is fixed to the inner panel front portion 31, and the collar 51 is interposed between the wheel arch reinforcement member 102 and the inner panel front portion 31. For example, the collar 51 is fixed to one of the wheel arch reinforcement member 102 and the inner panel front portion 31.

The arch attachment hole 53 is formed in the arch attachment area 104a. The panel attachment area 33b is an area of the panel front section 33 opposite to the arch attachment area 42a. The panel attachment hole 54 is formed in the panel attachment area 33b. In a state in which the collar 51 is interposed between the arch attachment area 104a and the panel attachment area 33b, the collar 51, the arch attachment hole 53 and the panel attachment hole 54 are disposed coaxially with each other.

In a state in which the wheel arch reinforcement member 102 is joined along the inner panel front portion 31, the rear end portion 12a of the side sill 12 is provided on the front end portion 102a of the wheel arch reinforcement member 102.

For example, the side sill 12 is disposed on a left outer side of the vehicle body in the vehicle width direction, and extends from the front end portion 102a of the wheel arch reinforcement member 102 in the forward direction of the vehicle body. The side sill 12 includes the inner side sill 57, the side sill reinforcement member 58 and the side sill outer panel part 17a (see FIG. 1).

The side sill reinforcement member 58 has the rear end portion 58a that extends along the front end portion 102a of the wheel arch reinforcement member 102 toward a rear upper side of the vehicle body. Accordingly, the rear end portion 58a of the side sill reinforcement member 58 extends with respect to the corner section 22 formed in a V shape at the door opening section 18 toward a rear upper side of the vehicle body. The rear end portion 58a of the side sill reinforcement member 58 extending to the front end portion 102a of the wheel arch reinforcement member 102 is disposed to overlap the front end portion 102a from an outer side (an upper side) of the vehicle body.

Specifically, in the rear end portion 58a of the side sill reinforcement member 58, the side sill reinforcement upper wall 64 flatly extends to the arch reinforcement apex section 104 toward a rear upper side of the vehicle body. The side sill attachment hole 71 is formed at a center of the side sill reinforcement upper wall 64 in the vehicle width direction. The fastening nut 72 is fixed to a surface of the side sill reinforcement upper wall 64 at a position corresponding to the side sill attachment hole 71 and on a side opposite to the side sill outer panel part 17a (see FIG. 1) through welding.

In addition, in the rear end portion 58a of the side sill reinforcement member 58, the side sill reinforcement outer wall 63 extends to the front end portion 31a of the inner panel front portion 31 toward a rear upper side of the vehicle body. In the rear end portion 58a of the side sill reinforcement member 58, the side sill reinforcement outer wall 63 has the outer end portion 63a that overhangs diagonally downward along the panel outer flange 37 of the inner panel front portion 31 toward an outer lower side in the vehicle width direction. The outer end portion 63a of the side sill reinforcement outer wall 63 is joined to the panel outer flange 37 of the inner panel front portion 31 from an outer side of the vehicle body.

Further, in the rear end portion 58a of the side sill reinforcement member 58, the side sill reinforcement upper flange 66 extends to the panel inner flange 36 of the inner panel front portion 31 toward a rear upper side of the vehicle body. The side sill reinforcement upper flange 66 is joined to the panel inner flange 36 from an outer side of the vehicle body.

The side sill reinforcement upper flange 66 is joined to the arch reinforcement inner flange 45 (i.e., the wheel arch reinforcement member 102) via the panel inner flange 36, the panel inner folding section 35 and the panel inner standing upper section 34.

Accordingly, in a simple configuration in which the side sill reinforcement upper flange 66 is formed on the rear end portion 58a of the side sill reinforcement member 58, the rear end portion 58a of the side sill reinforcement member 58 and the front end portion 102a of the wheel arch reinforcement member 102 can be strongly connected to each other. Accordingly, the side sill reinforcement member 58 can be easily manufactured.

In addition, the outer panel inner flange 17c of the side sill outer panel part 17a is joined to the side sill reinforcement upper flange 66 from an outer side of the vehicle body. Further, the outer panel outer flange 17d of the side sill outer panel part 17a is joined to the outer end portion 63a of the side sill reinforcement outer wall 63 from an outer side of the vehicle body. Accordingly, the side sill outer panel part 17a is fixed to (the rear end portion 58a of) the side sill reinforcement member 58 while overlapping the side sill reinforcement member 58 from an outer side of the vehicle body.

In this case, the side panel assembly 70 is constituted by the side sill reinforcement member 58 and the side sill outer panel part 17a. In other words, in the side panel assembly 70, the side sill outer panel part 17a is fixed to the side sill reinforcement member 58, and the fastening nut 72 is provided on a surface of the rear end portion 58a of the side sill reinforcement member 58 at the side of the side sill outer panel part 17a.

When the side panel assembly 70 is fixed to the floor assembly 110 from an outer side of the vehicle body, the rear end portion 58a of the side sill reinforcement member 58 is disposed on the front end portion 102a of the wheel arch reinforcement member 102 while overlapping the front end portion 102a from an outer side of the vehicle body. In this state, the collar 51 is disposed coaxially with a position of the side sill reinforcement upper wall 64 corresponding to the fastening nut 72.

The fastening bolt 74 is fastened to the fastening nut 72 via the panel attachment hole 54, the collar 51, the arch attachment hole 53 and the side sill attachment hole 71 from an outer side of the vehicle body. Accordingly, the side panel assembly 70 is attached to the floor assembly 110 from an outer side of the vehicle body.

In other words, in the vehicle including the outer side panel 17, the front end portion 102a of the wheel arch reinforcement member 102 can be reliably (strongly) bonded to the rear end portion 58a of the side sill reinforcement member 58 by the fastening nut 72 and the fastening bolt 74 from an outer side of the vehicle body.

Here, the corner section 22 of the door opening section 18 is formed in a V shape by the side sill 12 and the inner panel front portion 31. For this reason, for example, it is conceivable that stress is concentrated on the corner section 22 when a load is input to the vehicle body due to a lateral collision.

Here, the rear end portion 58a of the side sill reinforcement member 58 extends with respect to the corner section 22 in a rear upward direction of the vehicle body. Accordingly, the fastening section where the rear end portion 58a of the side sill reinforcement member 58 and the front end portion 102a of the wheel arch reinforcement member 102 are fastened by using the fastening bolt 74 and the fastening nut 72 can be separated from the corner section 22. In addition, the front end portion 102a of the wheel arch reinforcement member 102 and the rear end portion 58a of the side sill reinforcement member 58 can be reliably (strongly) bonded by the fastening nut 72 and the fastening bolt 74.

Accordingly, for example, when a load F2 is input to the vehicle body due to a lateral collision and stress is concentrated on the corner section 22 formed in a V shape by the side sill reinforcement member 58 and the inner panel front portion 31, stress can be supported by the corner section 22.

In addition, it is conceivable that the fastening section where the rear end portion 58a of the side sill reinforcement member 58 and the front end portion 102a of the wheel arch reinforcement member 102 are fastened by using the fastening bolt 74 and the fastening nut 72 becomes a relatively weak area. Here, the fastening section fastened by the fastening bolt 74 and the fastening nut 72 are disposed to be separated from the corner section 22. Accordingly, strength and rigidity of the corner section 22 formed in the V shape can be secured. Accordingly, for example, when stress is concentrated on the corner section 22 by the load F2 input due to a lateral collision, stress can be supported by the corner section 22.

In addition, the rear end portion 58a of the side sill reinforcement member 58 extends along the front end portion 102a of the wheel arch reinforcement member 102 toward a rear upper side of the vehicle body. In a state in which the rear end portion 58a and the front end portion 102a are disposed along each other, the rear end portion 58a is fastened to the front end portion 102a by the fastening bolt 74 and the fastening nut 72. Accordingly, for example, the fastening section between the rear end portion 58a and the front end portion 102a can increase bending rigidity with respect to the load in the upward/downward direction input to the wheel arch reinforcement member 102.

Further, in a state in which the rear end portion 58a of the side sill reinforcement member 58 is fastened to the front end portion 102a of the wheel arch reinforcement member 102, a bulkhead 115 is provided in the vicinity of the front end portion 102a and a further rear upper side of the vehicle body than the front end portion 16a. The bulkhead 115 is covered with the rear wheel outer section 17b from an outer side in the vehicle width direction.

Accordingly, the fastening section where the rear end portion 58a of the side sill reinforcement member 58 is fastened to the front end portion 102a of the wheel arch reinforcement member 102 can be reinforced by the bulkhead 115 and more strongly connected thereto. Accordingly, for example, when the load F2 is input to the vehicle body due to a lateral collision and stress is concentrated on the corner section 22 formed in the V shape, stress can be supported better by the corner section 22.

In addition, for example, the fastening section between the rear end portion 58a and the front end portion 102a can increase bending rigidity with respect to the load in the upward/downward direction input to the wheel arch reinforcement member 102.

In addition, the components of the above-mentioned embodiments can be appropriately replaced with known components without departing from the scope of the present invention, and the above-mentioned variants may be appropriately combined with each other.

For example, while the fastening nut 72 has been exemplified as the first fastening member and the fastening bolt 74 has been exemplified as the second fastening member in the first embodiment and the second embodiment, another fastening member may also be used as the first fastening member or the second fastening member.

In addition, while the inner of rear wheel house has been exemplified as the inner wheel house in the first embodiment and the second embodiment, for example, a front inner wheel house may also be used as the inner wheel house.

Further, the front end portion 16a of the wheel arch reinforcement member 16 and the rear end portion 58a of the side sill reinforcement member 58 can be placed not only in one place of the fastening nut 72 and the fastening bolt 74 but also in a plurality of places in the vehicle width direction.

REFERENCE SIGNS LIST 10, 100 Vehicle body side structure
12 Side sill
16, 102 Wheel arch reinforcement member
16a, 102a Front end portion of wheel arch reinforcement member
17 Outer side panel
17a Side sill outer panel part
17b Rear wheel outer section
18 Door opening section
22 Corner section
26 Inner panel
27 Inner of rear wheel house (inner wheel house)
31 Inner panel front portion
37 Panel outer flange (outer side end of inner panel, wheel arch flange)
38 Hollow structure
40, 110 Floor assembly
51 Collar
58 Side sill reinforcement member
58a Rear end portion of side sill reinforcement member
66 Side sill reinforcement upper flange (folded flange)
70 Side panel assembly
72 Fastening nut (first fastening member)
74 Fastening bolt (second fastening member)
115 Bulkhead

What is claimed is:

1. A vehicle body side structure comprising:
a side panel assembly that has an outer side panel fixed to a side sill reinforcement member and that has a first fastening member provided on a surface of the side sill reinforcement member at a side of the outer side panel; and
a floor assembly that has a wheel arch reinforcement member fixed to an inner panel and that has a collar interposed between the wheel arch reinforcement member and the inner panel at a position corresponding to the first fastening member,
wherein the side panel assembly is assembled to the floor assembly from an outer side of a vehicle body by fastening a second fastening member to the first fastening member via the inner panel, the collar, the wheel arch reinforcement member and the side sill reinforcement member from the outer side of the vehicle body.

2. The vehicle body side structure according to claim 1, wherein a front end portion of the wheel arch reinforcement member is widened so as to match with the side sill reinforcement member such that a hollow structure formed between the inner panel and the wheel arch reinforcement member is continuous with a hollow side sill.

3. The vehicle body side structure according to claim 1, wherein the side sill reinforcement member is fastened to the wheel arch reinforcement member at an upper side of a corner section formed in a V shape at a door opening section.

4. The vehicle body side structure according to claim 1, wherein the side sill reinforcement member extends along an outer side end of the inner panel to an upper side of a corner section formed in a V shape at a door opening section and has a rear end portion fastened to the wheel arch reinforcement member.

5. The vehicle body side structure according to claim 1, wherein the wheel arch reinforcement member is narrower than the side sill reinforcement member, and
the side sill reinforcement member extends to an upper side of a corner section formed in a V shape at a door opening section and is fastened to the wheel arch reinforcement member.

6. The vehicle body side structure according to claim 1, comprising an inner wheel house disposed at an inner side of the inner panel in a vehicle width direction,
wherein the wheel arch reinforcement member is disposed at a position opposite to the inner wheel house via the inner panel, and
the wheel arch reinforcement member and the inner wheel house are joined in a state in which the inner panel is interposed between the wheel arch reinforcement member and the inner wheel house.

7. The vehicle body side structure according to claim 1, wherein the inner panel has a wheel arch flange provided at an outer side in the vehicle width direction and to which the outer side panel is joined, and
the wheel arch flange is inclined toward the outer side in the vehicle width direction at a downward gradient.

8. The vehicle body side structure according to claim 5, wherein the side sill reinforcement member has a folded flange fastened to the wheel arch reinforcement member at a rear end portion of the side sill reinforcement member.

9. The vehicle body side structure according to claim 5, wherein the side sill reinforcement member has a rear end portion extending along the wheel arch reinforcement member and fastened to the wheel arch reinforcement member.

10. The vehicle body side structure according to claim 9, wherein the rear end portion of the side sill reinforcement member comprises a bulkhead configured to reinforce an area fastened to the wheel arch reinforcement member.

* * * * *